(12) United States Patent
Kulp et al.

(10) Patent No.: US 8,697,239 B2
(45) Date of Patent: Apr. 15, 2014

(54) MULTI-FUNCTIONAL POLISHING PAD

(75) Inventors: Mary Jo Kulp, Newark, DE (US); Ethan Scott Simon, Abington, PA (US)

(73) Assignee: Rohm and Haas Electronic Materials CMP Holdings, Inc., Newark, DE (US)

( * ) Notice: Subject to any disclaimer, the term of this patent is extended or adjusted under 35 U.S.C. 154(b) by 531 days.

(21) Appl. No.: 12/460,809

(22) Filed: Jul. 24, 2009

(65) Prior Publication Data

US 2011/0021123 A1    Jan. 27, 2011

(51) Int. Cl.
  *B24B 1/00*    (2006.01)
  *B24D 3/32*    (2006.01)
  *B24D 3/34*    (2006.01)
  *H01L 21/461*  (2006.01)
  *H01L 21/302*  (2006.01)

(52) U.S. Cl.
  USPC ........................................................ 428/423.1

(58) Field of Classification Search
  USPC ........................................................ 428/423.1
  See application file for complete search history.

(56) References Cited

U.S. PATENT DOCUMENTS

| | | | |
|---|---|---|---|
| 3,980,606 A * | 9/1976 | Werner | 524/775 |
| 5,578,362 A * | 11/1996 | Reinhardt et al. | 428/147 |
| 5,648,447 A * | 7/1997 | Seneker et al. | 528/63 |
| 6,998,166 B2 * | 2/2006 | Prasad | 428/141 |
| 7,169,030 B1 * | 1/2007 | Kulp | 451/527 |
| 7,217,179 B2 | 5/2007 | Sakurai et al. | |
| 7,329,174 B2 | 2/2008 | Hosaka et al. | |
| 7,371,160 B1 * | 5/2008 | Cruz et al. | 451/526 |
| 7,445,847 B2 | 11/2008 | Kulp | |
| 2005/0227088 A1 * | 10/2005 | Cooper et al. | 428/423.1 |
| 2006/0135724 A1 * | 6/2006 | Lawrey et al. | 528/44 |
| 2006/0142475 A1 * | 6/2006 | Chen et al. | 524/591 |
| 2007/0190905 A1 * | 8/2007 | Shimomura et al. | 451/29 |

* cited by examiner

*Primary Examiner* — Callie Shosho
*Assistant Examiner* — Coris Fung
(74) *Attorney, Agent, or Firm* — Blake T. Biederman

(57) ABSTRACT

The polishing pad is suitable for polishing patterned semiconductor substrates containing at least one of copper, dielectric, barrier and tungsten. The polishing pad includes a polymeric matrix; and the polymeric matrix being a polyurethane reaction product of a polyol blend, a polyamine or polyamine mixture and toluene diisocyanate. The polyol blend is a mixture of 15 to 77 weight percent total polypropylene glycol and polytetramethylene ether glycol; and the mixture of polypropylene glycol and polytetramethylene ether glycol having a weight ratio of the polypropylene glycol to the polytetramethylene ether glycol from a 20 to 1 ratio to a 1 to 20 ratio. The polyamine or polyamine mixture is 8 to 50 weight percent; and the toluene diisocyanate is 15 to 35 weight percent total monomer or partially reacted toluene diisocyanate monomer.

9 Claims, No Drawings

MULTI-FUNCTIONAL POLISHING PAD

BACKGROUND

This specification relates to polishing pads useful for polishing or planarizing semiconductor substrates. The production of semiconductors typically involves several chemical mechanical polishing (CMP) processes. In each CMP process, a polishing pad in combination with a polishing solution, such as an abrasive-containing polishing slurry or an abrasive-free reactive liquid, removes excess material in a manner that planarizes or maintains flatness for receipt of a subsequent layer. The stacking of these layers combines in a manner that forms an integrated circuit. The fabrication of these semiconductor devices continues to become more complex due to requirements for devices with higher operating speeds, lower leakage currents and reduced power consumption. In terms of device architecture, this translates to finer feature geometries and increased numbers of metallization levels. These increasingly stringent device design requirements are driving the adoption of smaller and smaller line spacing with a corresponding increase in pattern density. The devices' smaller scale and increased complexity have led to greater demands on CMP consumables, such as polishing pads and polishing solutions. In addition, as integrated circuits' feature sizes decrease, CMP-induced defectivity, such as, scratching becomes a greater issue. Furthermore, integrated circuits' decreasing film thickness requires improvements in defectivity while simultaneously providing acceptable topography to a wafer substrate; these topography requirements demand increasingly stringent planarity, line dishing and small feature array erosion polishing specifications.

Historically, cast polyurethane polishing pads have provided the mechanical integrity and chemical resistance for most polishing operations used to fabricate integrated circuits. For example, polyurethane polishing pads have sufficient tensile strength and elongation for resisting tearing; abrasion resistance for avoiding wear problems during polishing; and stability for resisting attack by strong acidic and strong caustic polishing solutions. The IC1000™ polishing pad supplied by Dow Electronic Materials represents the industry standard polyurethane polishing pad suitable for polishing multiple substrates, such as aluminum, barrier materials, dielectrics, copper, hard masks, low-k dielectric, tungsten and ultra low-k dielectrics (IC1000 is a trademark of Dow Electronic Materials or its affiliates.).

M. J. Kulp, in U.S. Pat. No. 7,169,030, discloses a family of polyurethane polishing pads having high tensile modulus. These polishing pads provide excellent planarization and defectivity for several combinations of polishing pads and polishing slurries. For example, these polishing pads can provide excellent polishing performance for ceria-containing polishing slurries, for polishing silicon oxide/silicon nitride applications, such as direct shallow trench isolation (STI) polishing applications. For purposes of this specification, silicon oxide refers to silicon oxide, silicon oxide compounds and doped silicon oxide formulations useful for forming dielectrics in semiconductor devices; and silicon nitride refers to silicon nitrides, silicon nitride compounds and doped silicon nitride formulations useful for semiconductor applications. Unfortunately, these pads do not have universal applicability for improving polishing performance with all polishing slurries for the multiple substrate layers contained in today's and future semiconductor wafers. Furthermore, as the cost of semiconductor devices decreases, there remains a need for further and further increases in polishing performance.

For patterned wafers, nonferrous metal polishing such as copper polishing remains an important demanding application for integrated circuit and memory applications. In the manufacture of semiconductors a copper layer often blankets the entire wafer. The polishing pad must provide excellent bulk copper removal, leaving a network of copper interconnects. There remains a demand for polishing pads with improved polishing performance for nonferrous substrates, such as copper polishing.

In addition, increasing a polishing pad's removal rate can increase throughput to decrease a semiconductor fabrication plant's equipment footprint and expenditure. Because of this demand for increasing performance, there remains a desire for a polishing pad to remove substrate layers with increased performance. For example, oxide dielectric removal rates are important for removing dielectrics during inter-layer dielectric ("ILD") or inter-metallic dielectric ("IMD") polishing. Specific types of dielectric oxides in use include the following: BPSG, TEOS formed from the decomposition of tetraethyloxysilicates, HDP ("high-density plasma") and SACVD ("sub-atmospheric chemical vapor deposition"). There is an ongoing need for polishing pads that have increased removal rate in combination with acceptable defectivity performance and wafer uniformity. In particular, there is a desire for polishing pads suitable for ILD polishing with an accelerated oxide removal rate in combination with acceptable planarization and defectivity polishing performance.

STATEMENT OF INVENTION

An aspect of the invention provides a polishing pad suitable for polishing patterned semiconductor substrates containing at least one of copper, dielectric, barrier and tungsten, the polishing pad comprising a polymeric matrix, the polymeric matrix being a polyurethane reaction product of a polyol blend, a polyamine or polyamine mixture and toluene diisocyanate, the polyol blend being a mixture of 15 to 77 weight percent total polypropylene glycol and polytetramethylene ether glycol and the mixture of polypropylene glycol and polytetramethylene ether glycol having a weight ratio of the polypropylene glycol to the polytetramethylene ether glycol from a 20 to 1 ratio to a 1 to 20 ratio, the polyamine or polyamine mixture being 8 to 50 weight percent and the toluene diisocyanate being 15 to 35 weight percent total monomer or partially reacted toluene diisocyanate monomer.

Another aspect of the invention provides a polishing pad suitable for polishing patterned semiconductor substrates containing at least one of copper, dielectric, barrier and tungsten, the polishing pad comprising a polymeric matrix, the polymeric matrix being a polyurethane reaction product of a polyol blend, a polyamine or polyamine mixture and toluene diisocyanate, the polyol blend being a mixture of 20 to 75 weight percent total polypropylene glycol and polytetramethylene ether glycol and the mixture of polypropylene glycol and polytetrarnethylene ether having a weight ratio of the polypropylene glycol to the polytetramethylene ether glycol from a 15 to 1 ratio to a 1 to 15 ratio, the polyamine or polyamine mixture being 10 to 45 weight percent and the toluene diisocyanate being 20 to 30 weight percent total monomer or partially reacted toluene diisocyanate monomer.

DETAILED DESCRIPTION

The invention provides a polishing pad suitable for planarizing at least one of semiconductor, optical and magnetic substrates, the polishing pad comprising a polymeric matrix.

In particular, it has been discovered that a polymeric matrix from a polyurethane reaction product of a polyamine and a blend of polypropylene glycol (PPG), polytetramethylene ether glycol (PTMEG), and toluene diisocyanate provides a multi-functional pad useful for copper and ILD polishing. In particular, pads manufactured with these ranges can provide improved polishing performance in comparison to industry standard IC1000 polishing pads for both ILD and copper applications.

The polishing pads of the invention are efficacious for copper polishing. In particular, the pads can increase copper removal rate without a corresponding increase in defectivity. Alternatively, the pads can lower defectivity without a corresponding decrease in removal rate. For purposes of the specification, the removal rate refers to the removal rate as expressed in Å/min.

The polishing pads are particularly suitable for polishing and planarizing ILD dielectric materials as in inter-layer dielectric (ILD) applications and are suitable for non-ferrous applications, such as aluminum, copper and tungsten. The pads provide increased removal rate over current pads—especially in the first 30 seconds of polishing. The accelerated response of the pads during the early part of polishing makes possible increased wafer throughput by shortening needed polishing time to remove a specified amount of material from a wafer surface.

The removal rate for ILD polishing with fumed silica at 30 seconds can be greater than 3750 Å/minute. Furthermore, the invention may provide at least a 10 percent higher removal rate than the removal rate at 30 seconds given by IC1010™ polyurethane polishing pads in the same polishing test. (IC1010 is a trademark of Dow Electronic Materials or its affiliates.) Advantageously, the removal rate for the polishing pads of the invention at thirty seconds for polishing TEOS sheet wafers with a silica-containing abrasive is equal to or greater than the removal rate for IC1000 polishing pads for polishing TEOS sheet wafers with a silica-containing abrasive at both thirty and sixty seconds. IC1000™ may increase TEOS removal rate with polishing time because it comprises aliphatic isocyanate that tends to impart thermoplastic character to parts made from the ingredients. The thermoplastic character of IC1000 polishing pads appears to facilitate an increase in contact between the polishing pad and the wafer along with an increase in removal rate until some maximum in removal rate occurs. Increasing pad-to-wafer contact area to ever higher levels appears to decrease removal rate as the localized asperity to wafer contact pressure decreases.

Although removal rate can increase with increasing abrasive content, an improvement over IC1010 polishing pad's removal rate independent of abrasive level represents an important advance in polishing performance. For example, this facilitates increasing removal rate with low defectivity and may decrease slurry costs. In addition to removal rate, wafer-scale nonuniformity also represents an important polishing performance consideration. Typically, because polished wafer uniformity is important for getting the maximum number of well-polished dies, the within-wafer nonuniformity should be less than 6 percent.

For purposes of this specification, "polyurethanes" are products derived from difunctional or polyfunctional isocyanates, e.g. polyetherureas, polyisocyanurates, polyurethanes, polyureas, polyurethaneureas, copolymers thereof and mixtures thereof. Cast polyurethane polishing pads are suitable for planarizing semiconductor, optical and magnetic substrates. The pads' particular polishing properties arise in part from a reaction product of a blend of polypropylene glycol (PPG) and polytetramethylene ether glycol (PTMEG), a polyamine and toluene diisocyanate. It has been discovered that controlling the ratio of the PPG/PTMEG ratio in combination with a polyamine and toluene diisocyanate can produce multi-functional polishing pads with improved polishing performance. In particular, these pads can improve polishing for copper, ILD and STI applications.

The polymer matrix arises from a mixture containing a total of 15 to 77 weight percent PPG and PTMEG. For purposes of this specification, the formulations are expressed in weight percent, unless specifically noted otherwise. Preferably, the polymer matrix arises from mixture containing a total of 20 to 75 weight percent PPG and PTMEG. In addition, the mixture contains a PPG/PTMEG ratio from a 20 to 1 ratio to a 1 to 20 ratio. Preferably, it contains a PPG/PTMEG ratio from a 15 to 1 ratio to a 1 to 15 ratio. A PPG/PTMEG ratio from a 2 to 1 ratio to a 1 to 2 ratio is of particular interest for high rate copper and ILD polishing. In addition, a PPG/PTMEG ratio from 20 to 1 ratio to 2 to 1 ratio and preferably from 15 to 1 ratio to 2 to 1 ratio is of particular interest for low defect copper and ILD polishing. Similarly, a PPG/PTMEG ratio from 1 to 20 to 1 to 2 and preferably from 1 to 15 to 1 to 2 is also of particular interest for low defect copper and ILD polishing.

The liquid mixture includes toluene diisocyanate (TDI) as monomer or partially reacted monomer of 15 to 35 weight percent. For purposes of this specification, TDI monomer or partially reacted monomer represents the weight percent TDI monomer or TDI monomer reacted into a prepolymer before curing the polyurethane. Preferably, the TDI monomer or partially reacted monomer represents 20 to 30 weight percent. Optionally, the aromatic TDI may contain some aliphatic isocyanate. Preferably, the polyfunctional aromatic isocyanate contains less than 15 weight percent aliphatic isocyanates and more preferably, less than 12 weight percent aliphatic isocyanate. Most preferably, the mixture contains only impurity levels of aliphatic isocyanate.

A particular example of a suitable PTMEG-based prepolymer capable of producing polymers within this TDI range is Adiprene® prepolymer LF750D manufactured by Chemtura. Examples of suitable PPG-based prepolymers include Adiprene® prepolymer LFG740D and LFG963A. In addition, LF750D, LFG740D and LFG963A represent low-free isocyanate prepolymers that have less than 0.1 weight percent each of free 2,4 and 2,6 TDI monomers and has a more consistent prepolymer molecular weight distribution than conventional prepolymers. "Low-free" prepolymers with improved prepolymer molecular weight consistency and low free isocyanate monomer facilitate a more regular polymer structure, and contribute to improved polishing pad consistency.

The polymeric matrix typically has included raw materials with a molar ratio of polyamine $NH_2$ to polyol OH of a 4 to 5 ratio to a 5 to 4 ratio; and a molar ratio of polyol OH to isocyanate NCO from a 0.9 to 1.0 ratio to a 1.1 to 1.0 ratio. Some of the OH groups can come from low molecular weight polyols or from water, either added purposely or by exposure to adventitious moisture. The polyol or polyamine can be partially reacted with isocyanate to form a prepolymer prior to producing the final polymer matrix or can be added to the isocyanate together in a one-step process.

Typically, the reaction mixture contains 8 to 50 weight percent of a polyamine or polyamine-containing mixture. Preferably, the mixture contains 10 to 45 weight percent of the polyamine or polyamine-containing mixture. For example, it is possible to mix the polyamine with an alcohol amine or a monoamine. For purposes of this specification, polyamines include diamines and other multifunctional amines. Example polyamines include aromatic diamines or polyamines, such as, 4,4'-methylene-bis-o-chloroaniline [MBCA], 4,4'-methylene-bis-(3-chloro-2,6-diethylaniline) [MCDEA]; dimethylthiotoluenediamine; trimethyleneglycol di-p-aminobenzoate; polytetramethyleneoxide di-p-aminobenzoate; polytetramethyleneoxide mono-p-aminobenzoate; polypropyleneoxide di-p-aminobenzoate; polypropyleneoxide mono-p-aminobenzoate; 1,2-bis(2-aminophenylthio)ethane; 4,4'-methylene-bis-aniline; diethyltoluenediamine; 5-tert-butyl-2,4- and 3-tert-butyl-2,6-toluenediamine; 5-tert-amyl-2,4- and 3-tert-amyl-2,6-toluenediamine and chlorotoluenediamine. A MBCA addition represents the preferred polyamine. It is possible to manufacture urethane polymers for polishing pads with a single mixing step or with the use of prepolymers.

The components of the polymer used to make the polishing pad are preferably chosen so that the resulting pad morphology is stable and easily reproducible. For example, when mixing 4,4'-methylene-bis-o-chloroaniline [MBCA] with toluene diisocyanate monomer or prepolymers to form polyurethane polymers, it is often advantageous to control levels of monoamine, diamine and triamine. Controlling the proportion of mono-, di- and triamines contributes to maintaining the chemical ratio and resulting polymer molecular weight within a consistent range. In addition, it is often important to control additives such as anti-oxidizing agents, and impurities such as water for consistent manufacturing. For example, because water reacts with isocyanate to form gaseous carbon dioxide, controlling the water concentration can affect the concentration of carbon dioxide bubbles that form pores in the polymeric matrix. Isocyanate reaction with adventitious water also reduces the available isocyanate for reacting with the polyamine, so it changes the molar ratio of OH or $NH_2$ to NCO groups along with the level of crosslinking (if there is an excess of isocyanate groups) and resulting polymer molecular weight.

The polyurethane polymeric material is preferably formed from a prepolymer reaction product of toluene diisocyanate with a polytetramethylene ether glycol/polypropylene glycol blend and a polyamine. Preferably the polyamine is an aromatic toluene diisocyanate. Most preferably, the aromatic diamine is 4,4'-methylene-bis-o-chloroaniline or 4,4'-methylene-bis-(3-chloro-2,6-diethylaniline).

The polishing pad is useful in both porous and non-porous or unfilled configurations. The finished polishing pad preferably has a density of 0.4 to 1.3 $g/cm^3$. For porous pads, the finished polyurethane polishing pads typically have a density of 0.5 to 1 $g/cm^3$. It is possible to add porosity through gas dissolution, blowing agents, mechanical frothing and introduction of hollow microspheres. Depending upon porosity level and composition, the polishing pad typically has a Shore D hardness of 20 to 70. For purposes of the specification, the Shore D test includes conditioning pad samples by placing them in 50 percent relative humidity for five days at 25° C. before testing and using methodology outlined in ASTM D2240 to improve the repeatability of the hardness tests.

The porosity typically has an average diameter of 2 to 50 μm. Most preferably, the porosity arises from hollow polymeric particles having a spherical shape. Preferably, the hollow polymeric particles have a weight average diameter of 2 to 40 μm. For purposes of the specification, weight average diameter represents the diameter of the hollow polymeric particle before casting; and the particles may have a spherical or non-spherical shape. Most preferably, the hollow polymeric particles have a weight average diameter of 10 to 30 μm.

The nominal range of expanded hollow-polymeric particles' weight average diameters is 15 to 90 μm. Furthermore, a combination of high porosity with small pore size can have particular benefits in reducing defectivity. If the porosity level becomes too high, however, the polishing pad loses mechanical integrity and strength. For example, adding hollow polymeric particles of 2 to 50 μm weight average diameter constituting 30 to 60 volume percent of the polishing layer facilitates a reduction in defectivity. Furthermore, maintaining porosity between 35 and 55 volume percent or specifically, 35 and 50 volume percent can facilitate increased removal rates. For purposes of this specification, volume percent porosity represents the volume percent of pores determined as follows: 1) subtracting the measured density of the formulation from the nominal density of the polymer without porosity to determine the mass of polymer "missing" from the a $cm^3$ of formulation; then 2) dividing the mass of "missing" polymer by the nominal density of the polymer without porosity to determine the volume of polymer missing from a $cm^3$ of formulation and multiplying by 100 to convert it to a porosity volume percentage. Alternatively, the volume percent of pores in a formulation or volume percent porosity can be determined as follows: 1) subtracting the mass of hollow polymeric particles in 100 g formulation from 100 g to determine the mass of polymer matrix in 100 g of formulation; 2) dividing the mass of polymer matrix by the nominal density of the polymer to determine the volume of polymer in 100 g of formulation; 3) dividing the mass of hollow polymeric particles in 100 g of formulation by the nominal hollow polymeric particle density to determine the volume of hollow polymeric particles in 100 g of formulation; 4) adding the volume of polymer in 100 g of formulation to the volume of hollow particles or pores in 100 g of formulation, to determine the volume of 100 g of formulation; then 5) dividing the volume of hollow particles or pores in 100 g of formulation by the total volume of 100 g of formulation and multiplying by 100 to give the volume percent of pores or porosity in the formulation. The two methods will produce similar values for volume percent porosity or pores, although the second method will show lower values of volume percent pores or porosity than the first method where parameters during processing, such as the reaction exotherm, can cause hollow polymeric particles or microspheres to expand beyond their nominal "expanded volume." Because a decrease in pore size tends to increase polishing rate for a specific pore or porosity level, it is important to control the exotherm during casting to prevent further expansion of the pre-expanded hollow polymeric particles or microspheres. For example, casting into a room temperature mold, limiting cake height, reducing prepolymer temperature, reducing polyamine or polyol temperature, reducing the NCO and limiting the free TDI monomer all contribute to reducing the exotherm produced by the reacting isocyanate.

As with most conventional porous polishing pads, polishing pad conditioning, such as diamond disk conditioning, serves to increase removal rate and improve wafer-scale non-uniformity. Although conditioning can function in a periodic manner, such as for 30 seconds after each wafer or in a continuous manner, continuous conditioning provides the advantage of establishing steady-state polishing conditions for improved control of removal rate. The conditioning typically increases the polishing pad removal rate and prevents the decay in removal rate typically associated with the wear of a polishing pad's surface. In particular, the abrasive conditioning forms a roughened surface that can trap fumed silica particles during polishing. In addition to conditioning, grooves and perforations can provide further benefit to the distribution of slurry, polishing uniformity, debris removal and substrate removal rate.

EXAMPLE

The polymeric pad materials were prepared by mixing various amounts of isocyanates as urethane prepolymers with 4,4'-methylene-bis-o-chloroaniline [MBCA] at 49° C. for the prepolymer and 115° C. for MBCA for examples of the invention (Comparative Examples included 43 to 63° C. for the prepolymer). In particular, mixtures of toluene diisocyanate prepolymers based on PTMEG and PPG provided polishing pads with improved polishing properties. The urethane/polyfunctional amine mixture was mixed with the hollow polymeric microspheres (EXPANCEL® 551DE20d60 or 551DE40d42 manufactured by AkzoNobel) either before or after mixing the prepolymer with the chain extender. The hollow polymeric microspheres were either mixed with the prepolymer at 60 rpm before adding the polyfunctional amine, then mixing the mixture at 4500 rpm or were added to the urethane/polyfunctional amine mixture in a mixhead at 3600 rpm. The microspheres had a weight average diameter of 15 to 50 µm, with a range of 5 to 200 µm. The final mixture was transferred to a mold and permitted to gel for about 15 minutes.

The mold was then placed in a curing oven and cured with a cycle as follows: thirty minutes ramped from ambient temperature to a set point of 104° C., fifteen and one half hours at 104° C. and two hours with a set point reduced to 21° C. The molded article was then "skived" into thin sheets and macrochannels or grooves were machined into the surface at room temperature—skiving at higher temperatures may improve surface roughness and sheet thickness uniformity. As shown in the Tables, samples 1 to 42 represent polishing pads of the invention and samples A to M represent comparative examples.

TABLE 1

| Sample | TDI min, (wt. %) | TDI max, (wt. %) | Polyamine min, (wt. %) | Polyamine max, (wt. %) | Total Polyol min, (wt. %) | Total Polyol max, (wt. %) | PTMEG min, (wt. %) | PTMEG max, (wt. %) | PPG min, (wt. %) | PPG max, (wt. %) |
|---|---|---|---|---|---|---|---|---|---|---|
| 1 | 24.28 | 25.11 | 18.06 | 18.68 | 56.21 | 57.65 | 25.41 | 26.11 | 30.80 | 31.54 |
| 2 | 24.84 | 25.70 | 16.19 | 16.76 | 57.54 | 58.97 | 26.01 | 26.71 | 31.53 | 32.27 |
| 3 | 24.84 | 25.70 | 16.19 | 16.76 | 57.54 | 58.97 | 26.01 | 26.71 | 31.53 | 32.27 |
| 4 | 24.84 | 25.70 | 16.19 | 16.76 | 57.54 | 58.97 | 26.01 | 26.71 | 31.53 | 32.27 |
| 5 | 23.75 | 24.54 | 19.86 | 20.52 | 54.94 | 56.39 | 24.83 | 25.54 | 30.11 | 30.85 |
| 6 | 24.28 | 25.11 | 18.06 | 18.68 | 56.21 | 57.65 | 25.41 | 26.11 | 30.80 | 31.54 |
| 7 | 23.75 | 24.54 | 19.86 | 20.52 | 54.94 | 56.39 | 24.83 | 25.54 | 30.11 | 30.85 |
| 8 | 24.28 | 25.11 | 18.06 | 18.68 | 56.21 | 57.65 | 25.41 | 26.11 | 30.80 | 31.54 |
| 9 | 23.75 | 24.54 | 19.86 | 20.52 | 54.94 | 56.39 | 24.83 | 25.54 | 30.11 | 30.85 |
| 10 | 28.14 | 29.00 | 16.29 | 16.79 | 54.20 | 55.57 | 41.60 | 42.68 | 12.61 | 12.89 |
| 11 | 27.34 | 28.16 | 18.66 | 19.22 | 52.62 | 54.00 | 40.38 | 41.47 | 12.24 | 12.53 |
| 12 | 27.81 | 28.65 | 17.27 | 17.80 | 53.55 | 54.92 | 41.09 | 42.18 | 12.45 | 12.74 |
| 13 | 27.51 | 28.34 | 18.15 | 18.69 | 52.97 | 54.34 | 40.65 | 41.73 | 12.32 | 12.60 |
| 14 | 27.96 | 28.81 | 16.83 | 17.35 | 53.84 | 55.21 | 41.32 | 42.41 | 12.52 | 12.81 |
| 15 | 27.66 | 28.50 | 17.71 | 18.25 | 53.26 | 54.63 | 40.87 | 41.96 | 12.39 | 12.67 |
| 16 | 21.98 | 22.89 | 14.33 | 14.92 | 62.19 | 63.69 | 10.63 | 10.92 | 51.56 | 52.77 |
| 17 | 21.44 | 22.30 | 16.44 | 17.10 | 60.60 | 62.12 | 10.36 | 10.65 | 50.24 | 51.47 |
| 18 | 21.76 | 22.65 | 15.19 | 15.81 | 61.55 | 63.05 | 10.52 | 10.81 | 51.02 | 52.24 |
| 19 | 21.54 | 22.41 | 16.03 | 16.67 | 60.91 | 62.43 | 10.41 | 10.70 | 50.50 | 51.72 |
| 20 | 21.87 | 22.77 | 14.76 | 15.37 | 61.87 | 63.37 | 10.58 | 10.87 | 51.29 | 52.51 |
| 21 | 21.65 | 22.53 | 15.61 | 16.24 | 61.23 | 62.74 | 10.47 | 10.76 | 50.76 | 51.98 |
| 22 | 29.66 | 30.62 | 17.76 | 18.37 | 51.01 | 52.59 | 25.51 | 26.21 | 25.51 | 26.38 |
| 23 | 30.51 | 31.53 | 15.39 | 15.93 | 52.54 | 54.10 | 26.27 | 26.96 | 26.27 | 27.14 |
| 24 | 30.22 | 31.22 | 16.19 | 16.76 | 52.02 | 53.59 | 26.01 | 26.71 | 26.01 | 26.88 |
| 25 | 30.22 | 31.22 | 16.19 | 16.76 | 52.02 | 53.59 | 26.01 | 26.71 | 26.01 | 26.88 |
| 26 | 29.66 | 30.62 | 17.76 | 18.37 | 51.01 | 52.59 | 25.51 | 26.21 | 25.51 | 26.38 |
| 27 | 29.11 | 30.04 | 19.27 | 19.91 | 50.05 | 51.62 | 25.02 | 25.73 | 25.02 | 25.89 |
| 28 | 29.11 | 30.04 | 19.27 | 19.91 | 50.05 | 51.62 | 25.02 | 25.73 | 25.02 | 25.89 |
| 29 | 30.51 | 31.53 | 15.39 | 15.93 | 52.54 | 54.10 | 26.27 | 26.96 | 26.27 | 27.14 |
| 30 | 28.85 | 29.76 | 20.00 | 20.67 | 49.58 | 51.15 | 24.79 | 25.49 | 24.79 | 25.66 |
| 31 | 29.66 | 30.62 | 17.76 | 18.37 | 51.01 | 52.59 | 25.51 | 26.21 | 25.51 | 26.38 |
| 32 | 30.51 | 31.53 | 15.39 | 15.93 | 52.54 | 54.10 | 26.27 | 26.96 | 26.27 | 27.14 |
| 33 | 28.85 | 29.76 | 20.00 | 20.67 | 49.58 | 51.15 | 24.79 | 25.49 | 24.79 | 25.66 |
| 34 | 29.06 | 29.91 | 19.67 | 20.25 | 49.83 | 51.26 | 39.87 | 40.96 | 9.97 | 10.31 |
| 35 | 30.00 | 30.90 | 17.10 | 17.62 | 51.48 | 52.91 | 41.18 | 42.27 | 10.30 | 10.64 |
| 36 | 28.19 | 28.99 | 22.09 | 22.72 | 48.29 | 49.72 | 38.63 | 39.72 | 9.66 | 10.00 |
| 37 | 30.00 | 30.90 | 17.10 | 17.62 | 51.48 | 52.91 | 41.18 | 42.27 | 10.30 | 10.64 |
| 38 | 29.68 | 30.56 | 17.97 | 18.52 | 50.92 | 52.35 | 40.74 | 41.82 | 10.18 | 10.52 |
| 39 | 28.19 | 28.99 | 22.09 | 22.72 | 48.29 | 49.72 | 38.63 | 39.72 | 9.66 | 10.00 |
| 40 | 31.05 | 32.20 | 13.60 | 14.17 | 53.64 | 55.35 | 10.73 | 11.01 | 42.91 | 44.34 |
| 41 | 31.05 | 32.20 | 13.60 | 14.17 | 53.64 | 55.35 | 10.73 | 11.01 | 42.91 | 44.34 |
| 42 | 30.79 | 31.91 | 14.33 | 14.92 | 53.17 | 54.89 | 10.63 | 10.92 | 42.53 | 43.97 |
| A | 19.41 | 20.29 | 15.63 | 16.34 | 63.38 | 64.96 | 0.00 | 0.00 | 63.38 | 64.96 |
| B | 19.41 | 20.29 | 15.63 | 16.34 | 63.38 | 64.96 | 0.00 | 0.00 | 63.38 | 64.96 |
| C | 19.85 | 20.77 | 13.70 | 14.34 | 64.89 | 66.45 | 0.00 | 0.00 | 64.89 | 66.45 |
| D | 19.85 | 20.77 | 13.70 | 14.34 | 64.89 | 66.45 | 0.00 | 0.00 | 64.89 | 66.45 |
| E | 19.85 | 20.77 | 13.70 | 14.34 | 64.89 | 66.45 | 0.00 | 0.00 | 64.89 | 66.45 |
| F | 19.41 | 20.29 | 15.63 | 16.34 | 63.38 | 64.96 | 0.00 | 0.00 | 63.38 | 64.96 |
| G | 19.85 | 20.77 | 13.70 | 14.34 | 64.89 | 66.45 | 0.00 | 0.00 | 64.89 | 66.45 |
| H | 19.41 | 20.29 | 15.63 | 16.34 | 63.38 | 64.96 | 0.00 | 0.00 | 63.38 | 64.96 |

TABLE 1-continued

| Sample | TDI min, (wt. %) | TDI max, (wt. %) | Polyamine min, (wt. %) | Polyamine max, (wt. %) | Total Polyol min, (wt. %) | Total Polyol max, (wt. %) | PTMEG min, (wt. %) | PTMEG max, (wt. %) | PPG min, (wt. %) | PPG max, (wt. %) |
|---|---|---|---|---|---|---|---|---|---|---|
| I | 28.07 | 28.81 | 22.60 | 23.20 | 47.99 | 49.33 | 47.99 | 49.33 | 0.00 | 0.00 |
| J | 28.07 | 28.81 | 22.60 | 23.20 | 47.99 | 49.33 | 47.99 | 49.33 | 0.00 | 0.00 |
| K | 27.48 | 28.18 | 24.24 | 24.86 | 46.96 | 48.29 | 46.96 | 48.29 | 0.00 | 0.00 |
| L | 31.18 | 32.39 | 13.04 | 13.65 | 53.96 | 55.78 | 0.00 | 0.00 | 53.96 | 55.78 |
| M | 21.38 | 22.09 | 19.86 | 20.30 | 51.24 | 52.35 | 51.24 | 52.35 | 0.00 | 0.00 |

TABLE 2

| Sample | Nominal Pore size, (μm) | Nominal Pore level, (wt. %) |
|---|---|---|
| 1 | 20 | 2.25 |
| 2 | 20 | 1.5 |
| 3 | 20 | 2.25 |
| 4 | 20 | 0.75 |
| 5 | 20 | 2.25 |
| 6 | 20 | 0.75 |
| 7 | 20 | 1.5 |
| 8 | 20 | 1.5 |
| 9 | 20 | 0.75 |
| 10 | 20 | 0.75 |
| 11 | 20 | 0.75 |
| 12 | 20 | 0.75 |
| 13 | 20 | 0.75 |
| 14 | 20 | 0.75 |
| 15 | 20 | 0.75 |
| 16 | 20 | 0.75 |
| 17 | 20 | 0.75 |
| 18 | 20 | 0.75 |
| 19 | 20 | 0.75 |
| 20 | 20 | 0.75 |
| 21 | 20 | 0.75 |
| 22 | 20 | 2.25 |
| 23 | 20 | 2.25 |
| 24 | 20 | 2.25 |
| 25 | 20 | 0.75 |
| 26 | 20 | 0.75 |
| 27 | 20 | 2.25 |
| 28 | 20 | 0.75 |
| 29 | 20 | 1.5 |
| 30 | 20 | 2.25 |
| 31 | 20 | 1.34 |
| 32 | 20 | 1.34 |
| 33 | 20 | 1.34 |
| 34 | 20 | 2.25 |
| 35 | 20 | 1.5 |
| 36 | 20 | 2.25 |
| 37 | 20 | 2.25 |
| 38 | 20 | 1.5 |
| 39 | 20 | 1.5 |
| 40 | 20 | 1.5 |
| 41 | 20 | 2.25 |
| 42 | 20 | 1.5 |
| A | 40 | 1.25 |
| B | 40 | 2 |
| C | 40 | 1.8 |
| D | 40 | 0.5 |
| E | 40 | 2 |
| F | 40 | 0.5 |
| G | 40 | 1.25 |
| H | 20 | 1.8 |
| I | 20 | 0.75 |
| J | 40 | 0.75 |
| K | 20 | 0.275 |
| L | 20 | 2.3 |
| M | 40 | 1.57 |

Pore levels are shown in Table 2 as the nominal weight percent to give a more consistent understanding of pore volume because different hollow microspore types and sizes have different densities for the same pore volumes. All pore levels are expressed in terms of Expancel 551 DE40d42 weight percent.

For copper polishing tests, example polishing pads were 80 mils (2.0 mm) thick and were grooved with a 120 mil (3.0 mm) pitch, 20 mil (0.51 mm) width, 30 mil (0.76 mm) depth circular groove with an overlaid x-y axis groove pattern having a pitch of 580 mils (14.7mm) and stacked on the SP2310 subpad. They were tested on a Mirra® polisher from Applied Materials, Inc. Initial pad break-in was done using a Diagrid® AD3BG150830 conditioning disk at 9 pounds down force for 60 minutes followed by polishing 20 copper dummy wafers for 60 seconds each using a platen rotation rate of 93 rpm, a wafer carrier head rotation rate of 87 rpm and a downforce of 3 psi (20.7 kPa). The polishing slurry was EPL2361 and was supplied at the polishing pad surface at a rate of 200 ml/min and was used both for initial pad break-in and for all wafer polishing. Pad cleaner EPL8105 was used between wafers to remove copper residue from the pad surface.

The polishing process for polishing copper sheet wafers for rate and defectivity was done in the same way as described for the dummy wafers, above. Each test with example pads also included wafers polished with the CUP4410 pad, an IC1000-based pad with the same grooving and sub-pad as used for the example pads, as a baseline. The normalization done in all tables used polishing data for the wafers polished by the IC1000-type pad in that test as the basis for normalization to account for common cause variation. The Diagrid conditioner specified above was used to diamond-condition the polishing pad during the polishing test using a full in-situ conditioning process with 7 pounds (48.3 kPa) down force.

Removal rates were measured by comparing pre-polish wafer measurements with post-polish wafer film thickness measurements using the CDE Corporation ResMap RS200 tool. For the pads shown in Table 3, defectivity was measured using the Applied Materials Orbot™ WF-720 tool with a scratch recipe. The identified defects were then reviewed using a Leica microscope and scratches, gouges and chattermarks were counted. Microscratches and chatter marks are defined as those <10 μm, while scratches and chatter marks are defined as those ≥10 μm.

TABLE 3

| Sample | CU RR - 3 psi (20.7 kPa) (Å/min) | Normal RR to Control avg. | CU NU % - 3 psi (20.7 kPa) | Normal NU % to Control avg. | Micro-scratch (Avg. No.) | Large-scratch (Avg. No.) | Micro-chatter (Avg. No.) | Large Chatter (Avg. No.) | Defectivity Review cts. (3 psi) (20.7 kPa) | Normal Review cts. to Control avg. |
|---|---|---|---|---|---|---|---|---|---|---|
| 1 | 6574 | 0.89 | 5.7 | 1.1 | 2.67 | 1.00 | 2.33 | 0.00 | 6.00 | 0.33 |
| 2 | 7230 | 0.98 | 4.9 | 1.0 | 1.57 | 0.33 | 2.63 | 0.57 | 5.11 | 0.28 |
| 3 | 7284 | 0.99 | 4.7 | 0.9 | 1.33 | 0.33 | 0.33 | 0.00 | 2.00 | 0.11 |
| 4 | 7319 | 0.99 | 5.9 | 1.2 | 1.67 | 1.70 | 1.70 | 0.00 | 5.07 | 0.28 |
| 5 | 5628 | 0.76 | 10.9 | 2.2 | 1.10 | 0.67 | 1.67 | 0.33 | 3.77 | 0.21 |
| 6 | 6371 | 0.87 | 6.8 | 1.4 | 1.00 | 0.67 | 1.33 | 0.00 | 3.00 | 0.17 |
| 7 | 5437 | 0.74 | 6.7 | 1.3 | 3.33 | 1.64 | 2.15 | 0.00 | 7.13 | 0.40 |
| 8 | 6075 | 0.88 | 2.2 | 0.7 | 1.15 | 0.33 | 1.49 | 0.00 | 2.97 | 0.42 |
| 9 | 5513 | 0.75 | 7.0 | 1.4 | 10.00 | 2.67 | 4.33 | 0.33 | 17.33 | 0.96 |
| 22 | 7879 | 1.13 | 7.1 | 1.3 | 48.63 | 6.38 | 4.40 | 0.40 | 59.80 | 0.23 |
| 23 | 8258 | 1.21 | 8.6 | 1.7 | 34.14 | 4.01 | 5.02 | 1.34 | 44.52 | 0.15 |
| 24 | 8080 | 1.14 | 2.8 | 0.3 | 135.73 | 15.96 | 15.60 | 3.09 | 170.38 | 0.47 |
| 25 | 7692 | 1.08 | 5.2 | 0.5 | 44.75 | 14.46 | 15.42 | 0.00 | 74.63 | 0.21 |
| 26 | 7694 | 1.08 | 5.7 | 0.5 | 62.39 | 19.82 | 12.14 | 0.83 | 95.18 | 0.26 |
| 27 | 7702 | 1.09 | 8.0 | 0.7 | 217.32 | 29.99 | 25.04 | 3.24 | 275.60 | 0.76 |
| 28 | 7274 | 1.03 | 7.3 | 0.7 | 348.07 | 45.67 | 42.86 | 0.00 | 436.61 | 1.20 |
| A | 5070 | 0.72 | 8.8 | 1.9 | 0.20 | 0.59 | 0.65 | 0.45 | 1.89 | 0.39 |
| B | 5430 | 0.74 | 4.6 | 0.6 | 0.50 | 0.50 | 0.50 | 0.50 | 2.00 | 0.50 |
| C | 4521 | 0.70 | 10.4 | 2.4 | 0.86 | 0.71 | 1.57 | 3.04 | 6.19 | 0.24 |
| D | 5362 | 0.73 | 6.9 | 0.9 | 0.59 | 2.25 | 1.77 | 5.31 | 9.92 | 2.48 |
| E | 5563 | 0.76 | 8.7 | 1.1 | 2.00 | 3.00 | 2.00 | 12.00 | 19.00 | 4.75 |
| F | 5239 | 0.81 | 8.0 | 1.7 | 2.60 | 1.60 | 2.40 | 0.60 | 7.20 | 0.46 |
| G | 5382 | 0.82 | 5.2 | 1.3 | 1.66 | 1.66 | 2.65 | 5.49 | 11.45 | 1.91 |
| H | 5112 | 0.70 | 4.8 | 0.6 | 0.00 | 1.00 | 0.50 | 0.50 | 2.00 | 0.50 |
| I | 6380 | 0.89 | 6.3 | 2.1 | 106.61 | 28.13 | 34.91 | 1.02 | 170.67 | 1.07 |
| J | 6628 | 0.92 | 5.0 | 1.7 | 119.23 | 56.96 | 50.75 | 6.82 | 233.77 | 1.46 |
| K | 6263 | 0.87 | 9.0 | 3.0 | 63.70 | 15.82 | 26.03 | 12.69 | 118.24 | 0.74 |
| L | 7744 | 1.10 | 2.8 | 0.7 | 12.64 | 3.39 | 7.22 | 0.33 | 23.57 | 1.09 |
| M | 6922 | 1.00 | 6.0 | 1.0 | 53.30 | 17.25 | 15.58 | 3.99 | 90.11 | 1.02 |

Example pads 2 through 4 showed similar rates to the CUP4410 pad, but with less than one third the number of scratches and chatter marks. Examples 22 through 28 showed increased removal rates over CUP4410 and examples 22 through 27 also significantly decreased defectivity.

For the pads shown in Table 4, polishing was done as it was for the pads shown in Table 3, but defectivity was measured using the KLA-Tencor SP1TBI tool, and defect review was done using the Leica microscope as before. Patterned wafers were also tested and polishing pads of the invention can provide equivalent or improved planarization, dishing and erosion compared to the CUP4410 pad.

TABLE 4

| Sample | CU RR - 3 psi (20.7 kPa) (Å/min) | Normal RR to Control avg. (Å/min) | CU NU % - 3 psi (20.7 kPa) | Normal NU % to Control avg. | SP-1 Defectivity Review cts. (3 psi) (20.7 kPa) | SP-1 Normal Review cts. to Control avg. |
|---|---|---|---|---|---|---|
| 2 | 7301 | 1.00 | 2.2 | 0.7 | 66 | 1.30 |
| 10 | 7549 | 1.14 | 4.1 | 0.9 | 10 | 0.49 |
| 11 | 6989 | 1.06 | 3.3 | 0.7 | 10 | 0.44 |
| 12 | 7572 | 1.14 | 6.6 | 1.6 | 13 | 0.61 |
| 13 | 7075 | 1.09 | 3.4 | 0.9 | 9 | 0.52 |
| 14 | 6996 | 1.07 | 2.3 | 0.6 | 10 | 0.57 |
| 15 | 6787 | 1.04 | 3.0 | 0.7 | 6 | 0.34 |
| 16 | 6327 | 0.94 | 4.0 | 0.4 | 5 | 0.05 |
| 17 | 6514 | 0.96 | 4.2 | 0.4 | 6 | 0.07 |
| 18 | 6463 | 0.96 | 2.2 | 0.2 | 4 | 0.05 |
| 19 | 6195 | 0.92 | 4.4 | 0.6 | 5 | 0.10 |
| 20 | 6318 | 0.94 | 3.5 | 0.5 | 5 | 0.21 |
| 21 | 6476 | 0.96 | 3.4 | 0.3 | 10 | 0.10 |
| 22 | 7768 | 1.10 | 4.6 | 0.4 | 78 | 0.37 |
| 23 | 8460 | 1.23 | 3.7 | 0.9 | 18 | 1.13 |
| 24 | 8218 | 1.14 | 2.5 | 0.5 | 51 | 0.67 |
| 25 | 7824 | 1.08 | 3.6 | 0.5 | 45 | 0.59 |
| 26 | 7729 | 1.07 | 4.1 | 0.7 | 115 | 1.72 |
| 27 | 7702 | 1.09 | 8.0 | 0.7 | 171 | 0.83 |
| 28 | 7274 | 1.03 | 7.3 | 0.7 | 288 | 1.39 |
| 29 | 7607 | 1.11 | 3.2 | 0.7 | 4 | 0.19 |
| 34 | 6981 | 1.13 | 6.7 | 1.3 | 12 | 1.10 |
| 35 | 7769 | 1.18 | 4.1 | 0.8 | 20 | 1.07 |
| 36 | 6700 | 1.09 | 7.0 | 1.4 | 9 | 0.82 |
| 37 | 7706 | 1.18 | 3.9 | 0.8 | 18 | 0.92 |

TABLE 4-continued

| Sample | CU RR - 3 psi (20.7 kPa) (Å/min) | Normal RR to Control avg. (Å/min) | CU NU % - 3 psi (20.7 kPa) | Normal NU % to Control avg. | SP-1 Defectivity Review cts. (3 psi) (20.7 kPa) | SP-1 Normal Review cts. to Control avg. |
|---|---|---|---|---|---|---|
| 38 | 6491 | 1.05 | 4.5 | 0.9 | 15 | 1.32 |
| 39 | 6176 | 1.00 | 4.1 | 0.8 | 17 | 1.58 |
| 40 | 7961 | 1.14 | 4.4 | 0.9 | 26 | 0.71 |
| 41 | 8174 | 1.18 | 3.6 | 0.7 | 32 | 0.86 |
| 42 | 7232 | 1.04 | 3.3 | 0.7 | 37 | 1.01 |
| I | 5981 | 0.91 | 7.4 | 1.2 | 47 | 1.88 |
| M | 6876 | 1.00 | 5.9 | 1.0 | 39 | 1.00 |

Example pads 10 through 15, 23, 24, 27, 40 and 41 increased removal rates with significantly reduced defectivity. Example pads 16 to 21 gave similar removal rates to CUP4410 with 80-95 percent fewer defects. Example 29 gave increased removal rate with 80 percent fewer defects than CUP4410.

Example polishing pads, Table 5, were tested on a Mirra® polisher from Applied Materials, Inc. using a platen rotation rate of 93 rpm, a wafer carrier head rotation rate of 87 rpm and a down force of 5 psi (34.5 kPa) to polish TEOS sheet wafers. The polishing slurry was ILD3225 used as a 1:1 mixture with DI water and supplied at the polishing pad surface a rate of 150 ml/min. A Diagrid® AD3BG150855 conditioning disk was used to diamond-condition the polishing pad using an in situ conditioning process. TEOS sheet wafers were polished for 30 seconds or for 60 seconds and each test with example pads also included wafers polished with the IC1010 pad as a baseline. The greatest importance was placed on the 30 second polish rates relative to IC1010 polishing pad because they would have the greatest effect on reducing polishing times over the standard polishing pad. The polishing results are below in Table 5.

TABLE 5

| Sample | 30 sec RR (Å/min) | 60 sec RR (Å/min) | WIW NU (%) | Normalized 30 sec RR (Å/min) | Normalized 60 sec RR (Å/min) | Defect Counts No. | Normalized Defect Counts |
|---|---|---|---|---|---|---|---|
| 22 | 3876 | 4143 | 4.0 | 1.15 | 1.09 | 39* | 0.55 |
| 23 | 4073 | 4395 | 3.5 | 1.15 | 1.11 | 16 | 0.48 |
| 27 | 3482 | 3762 | 3.5 | 1.09 | 1.03 | 61 | 0.59 |
| 30 | 3572 | 3770 | 4.5 | 1.01 | 0.95 | 17 | 0.50 |
| 31 | 3725 | 3975 | 4.7 | 1.05 | 1.00 | 25 | 0.75 |
| 32 | 3722 | 4039 | 4.2 | 1.05 | 1.02 | 19 | 0.56 |
| 33 | 3358 | 3608 | 5.1 | 0.95 | 0.91 | 30 | 0.88 |
| I | 3941 | 4274 | 7.5 | 1.11 | 1.09 | 181 | 1.87 |
| J | 3786 | 4070 | 5.5 | 1.07 | 1.04 | 165 | 1.71 |
| M | 3514 | 3928 | 3.2 | 1.00 | 1.00 | 123* | 1.00 |

*Represents an average from multiple wafers.

Example pads 22 and 23 gave 15 percent increase in removal rate at 30 seconds over the IC1010 pad and a 10 percent increase in removal rate at 60 seconds, while they gave about 50 percent fewer defects. Example pads 27 and 30 through 33 gave similar rates to IC1010, but gave fewer defects.

The multi-functional polyurethane polishing pad of the invention facilitates polishing in a plethora of polishing applications. For example, the particular PPG/PTMEG-polyamine-TDI polishing pad is efficacious for high-rate copper, low-defectivity copper, patterned wafer, TEOS, high-rate TEOS, low-defectivity TEOS and STI polishing applications. In particular, the polishing pad can increase removal rate for copper and TEOS applications with equivalent or improved defectivity relative to the single polyol IC1000 polishing pads. Similarly, the polishing pad can decrease defectivity for copper and TEOS applications with equivalent or improved removal rate relative to the single polyol IC1000 polishing pads.

The invention claimed is:

1. A polishing pad suitable for polishing patterned semiconductor substrates containing at least one of copper, dielectric, barrier and tungsten, the polishing pad comprising a polymeric matrix, the polymeric matrix consisting of a polyurethane reaction product consisting of a polyol blend, a polyamine or polyamine mixture and toluene diisocyanate, the polyol blend being a mixture of 15 to 77 weight percent total polypropylene glycol and polytetramethylene ether glycol and the mixture of polypropylene glycol and polytetramethylene ether glycol having a weight ratio of the polypropylene glycol to the polytetramethylene ether glycol from a 20 to 1 ratio to a 1 to 20 ratio, the polyamine or polyamine mixture being 8 to 50 weight percent in a liquid mixture, and the toluene diisocyanate being 20 to 30 weight percent total toluene diisocyanate monomer or partially reacted toluene diisocyanate monomer, all based on the total weight of the polymeric matrix.

2. The polishing pad of claim 1 wherein the weight ratio of the polypropylene glycol to the polytetramethylene ether glycol is from 2 to 1 to 1 to 2.

3. The polishing pad of claim 1 wherein the weight ratio of the polypropylene glycol to the polytetramethylene ether glycol is from 20 to 1 to 2 to 1.

4. The polishing pad of claim 1 wherein the weight ratio of the polypropylene glycol to the polytetramethylene ether glycol is from 1 to 20 to 1 to 2.

5. The polishing pad of claim 1 wherein the polishing pad has a Shore D hardness of 20 to 70.

6. A polishing pad suitable for polishing patterned semiconductor substrates containing at least one of copper, dielectric, barrier and tungsten, the polishing pad comprising a polymeric matrix, the polymeric matrix consisting of a polyurethane reaction product consisting of a polyol blend, a polyamine or polyamine mixture and toluene diisocyanate, the polyol blend being a mixture of 20 to 75 weight percent total polypropylene glycol and polytetramethylene ether glycol and the mixture of polypropylene glycol and polytetrarnethylene ether glycol having a weight ratio of the polypropylene glycol to the polytetramethylene ether glycol from a 15 to 1 ratio to a 1 to 15 ratio, the polyamine or polyamine mixture being 10 to 45 weight percent in a liquid mixture, and the toluene diisocyanate being 20 to 30 weight percent total toluene diisocyanate monomer or partially reacted toluene diisocyanate monomer, all based on the total weight of the polymeric matrix.

7. The polishing pad of claim 6 wherein the weight ratio of the polypropylene glycol to the polytetramethylene ether glycol is from 15 to 1 to 2 to 1.

8. The polishing pad of claim 6 wherein the weight ratio of the polypropylene glycol to the polytetramethylene ether glycol is from 1 to 15 to 1 to 2.

9. The polishing pad of claim 6 wherein the polishing pad has a Shore D hardness of 20 to 70.

\* \* \* \* \*